US010574652B2

(12) United States Patent
Desai et al.

(10) Patent No.: US 10,574,652 B2
(45) Date of Patent: Feb. 25, 2020

(54) SYSTEMS AND METHODS FOR CLOUD-BASED SERVICE FUNCTION CHAINING USING SECURITY ASSERTION MARKUP LANGUAGE (SAML) ASSERTION

(71) Applicant: Zscaler, Inc., San Jose, CA (US)

(72) Inventors: Purvi Desai, Cupertino, CA (US); Abhinav Bansal, San Jose, CA (US); Tejus Gangadharappa, Santa Clara, CA (US)

(73) Assignee: Zscaler, Inc., San Jose, CA (US)

( * ) Notice: Subject to any disclaimer, the term of this patent is extended or adjusted under 35 U.S.C. 154(b) by 395 days.

(21) Appl. No.: 15/404,761

(22) Filed: Jan. 12, 2017

(65) Prior Publication Data

US 2018/0198791 A1    Jul. 12, 2018

(51) Int. Cl.
*H04L 29/06*      (2006.01)
*H04L 29/08*      (2006.01)

(52) U.S. Cl.
CPC .......... *H04L 63/10* (2013.01); *H04L 63/0807* (2013.01); *H04L 67/327* (2013.01)

(58) Field of Classification Search
CPC ..... H04L 63/10; H04L 63/0807; H04L 67/10; H04L 67/327
See application file for complete search history.

(56) References Cited

U.S. PATENT DOCUMENTS

| 8,464,335 | B1 | 6/2013 | Sinha et al. |
| 8,495,737 | B2 | 7/2013 | Sinha et al. |
| 8,955,091 | B2 | 2/2015 | Kailash et al. |
| 9,060,239 | B1 | 6/2015 | Sinha et al. |
| 9,118,689 | B1 | 8/2015 | Desai et al. |
| 9,350,644 | B2 | 5/2016 | Desai et al. |
| 9,369,433 | B1 | 6/2016 | Paul et al. |
| 9,473,537 | B2 | 10/2016 | Sinha et al. |

(Continued)

OTHER PUBLICATIONS

"Sun Java System Access Manager 7.1 Federation and SAML Administration Guide" (C)2010 Oracle Inc. (10 pages) https://docs.oracle.com/cd/E19462-01/819-4674/6n6qelg82/index.html#gdqne (Year: 2010).*

(Continued)

*Primary Examiner* — Joseph P Hirl
*Assistant Examiner* — Thomas A Gyorfi
(74) *Attorney, Agent, or Firm* — Clements Bernard Walker; Lawrence A. Baratta, Jr.

(57) ABSTRACT

A cloud-based method of service function chaining using Security Assertion Markup Language (SAML) assertions includes receiving configuration information related to any of users, services, and correspondence between the users and the services; responsive to a request from a user, generating a SAML assertion for the request and attaching a stack of service tags with the SAML assertion, wherein the stack of service tags defines a service chain for the user and for the request; and providing the SAML assertion with the stack of service tags to the user in response to the request. The method can further include providing the SAML assertion by the user to one or more services, wherein each of the services creates a context based on the stack of service tags. Each of the services identifies itself in the stack and sends the SAML assertion to a next service or application in the stack.

18 Claims, 6 Drawing Sheets

(56) References Cited

U.S. PATENT DOCUMENTS

| | | | |
|---|---|---|---|
| 2004/0139319 A1* | 7/2004 | Favazza | H04L 63/0807 |
| | | | 713/168 |
| 2008/0010287 A1* | 1/2008 | Hinton | H04L 29/12594 |
| 2015/0237041 A1* | 8/2015 | Flamini | H04L 63/0807 |
| | | | 726/10 |
| 2015/0326613 A1 | 11/2015 | Devarajan et al. | |
| 2016/0261564 A1 | 9/2016 | Foxhoven et al. | |

OTHER PUBLICATIONS

Knouse, Charles "SAML Implementation Guidelines, Working Draft, Aug. 27, 2004" (40 pages) (C)Oasis Open 2004 https://www.oasis-open.org/committees/download.php/8958/sstc-saml-implementation-guidelines-draft-01.pdf (Year: 2004).*

Joost van Dijk. "Innovation Blog—Cloud: SAML for dummies" Published Feb. 8, 2013 (14 pages) https://blog.surf.nl/en/saml-for-dummies/ (Year: 2013).*

* cited by examiner

SYSTEMS AND METHODS FOR CLOUD-BASED SERVICE FUNCTION CHAINING USING SECURITY ASSERTION MARKUP LANGUAGE (SAML) ASSERTION

FIELD OF THE DISCLOSURE

The present disclosure relates generally to computer networking systems and methods. More particularly, the present disclosure relates to systems and methods for cloud-based service chaining using Security Assertion Markup Language (SAML) Assertion.

BACKGROUND OF THE DISCLOSURE

The current enterprise and/or consumer network-based service landscape is a kaleidoscope of various service functions (such as firewalls, Deep Packet Inspection (DPI), Wide Area Network (WAN) and application acceleration, server load balancers, Transmission Control Protocol (TCP) optimizers, etc.). These various service functions are commonly achieved through services provided by heterogeneous service providers. When a customer wants to avail just one specific service, the current client-server model works perfectly fine as the client can be directed to a server and after receiving the service, that particular transaction ends. With the advent of new services, there are new use cases. These services sometimes work in conjunction with each other and as well as independent. New use cases have arisen where services need to be chained, so-called service function chaining, i.e., while availing service A, there is a need to go through service Z, Y, X . . . , etc. Previously such services were provided by appliances hosted within an enterprise, and enterprise administrators could configure the service function chain manually by configuring their network devices physically or through a primitive Software Defined Networking (SDN)-controlled solution where network topology could be modified to support different functions. For consumers or mobile enterprise users, there are typically no savvy network administrators and those services would not be hosted in the homes, so it is not possible to configure such a chain.

In enterprises as well, administrators cannot configure a service in a chain by configuring their network because more and more services are moving to the cloud, and, if a service does not provide a way to configure a chain, then it is not possible to configure such a service. For any service to participate in the service chaining, they need to know the service before it, service after it, user credentials, and type of service needed. In typical cloud-based services, a mechanism to authenticate and authorize users is configured for services, but there is not an infrastructure where the admin/end-user can pick the service before and after. Even if it were possible to configure such service chaining, it is quite cumbersome to configure and maintain as each service may expose the configuration differently and in varied capability.

There is a need for a new service discovery and delivery architecture whereby end users do not have to configure the service chain on each service and each service does not have to implement complex service chaining attributes.

BRIEF SUMMARY OF THE DISCLOSURE

In an exemplary embodiment, a cloud-based method of service function chaining using Security Assertion Markup Language (SAML) assertions includes receiving configuration information related to any of users, services, and correspondence between the users and the services; responsive to a request from a user, generating a SAML assertion for the request and attaching a stack of service tags with the SAML assertion, wherein the stack of service tags defines a service chain for the user and for the request; and providing the SAML assertion with the stack of service tags to the user in response to the request. The cloud-based method can further include providing the SAML assertion by the user to one or more services, wherein each of the one or more services creates a context based on the stack of service tags. Each of the one or more services identifies itself in the stack of service tags and sends the SAML assertion to a next service or application in the stack of service tags. The stack of service tags can include a plurality of entries each identifying a service provider associated with a service and a direction for requests and responses. Configuration information can include an ordered set of the services for each user or groups of users. The receiving, generating, and providing can be performed by an Identity Provider. At least two of the services can be performed by different service providers such that the service chain extends between at least two service providers. Once the service chain is established, the user can be configured to forward packets with a service layer header identifying a SAML ID for service providers associated with the stack of service tags. The service providers can be configured to identify the service chain based on the SAML ID and to process the packets based thereon.

In another exemplary embodiment, a server configured to provide service function chaining using Security Assertion Markup Language (SAML) assertions includes a network interface communicatively coupled to the one or more cloud nodes; a processor communicatively coupled to the network interface; and memory storing computer-executable instructions that, when executed, cause the processor to: receive configuration information related to any of users, services, and correspondence between the users and the services; responsive to a request from a user, generate a SAML assertion for the request and attaching a stack of service tags with the SAML assertion, wherein the stack of service tags defines a service chain for the user and for the request; and provide the SAML assertion with the stack of service tags to the user in response to the request. The user can be configured to provide the SAML assertion by the user, wherein each of the one or more services creates a context based on the stack of service tags. Each of the one or more services identifies itself in the stack of service tags and sends the SAML assertion to a next service or application in the stack of service tags. The stack of service tags can include a plurality of entries each identifying a service provider associated with a service and a direction for requests and responses. Configuration information can include an ordered set of the services for each user or groups of users. The server can be operated by an Identity Provider. At least two of the services can be performed by different service providers such that the service chain extends between at least two service providers. Once the service chain is established, the user can be configured to forward packets with a service layer header identifying a SAML ID for service providers associated with the stack of service tags. The service providers can be configured to identify the service chain based on the SAML ID and to process the packets based thereon.

In a further exemplary embodiment, a non-transitory computer memory including instructions for service function chaining using Security Assertion Markup Language (SAML) assertions, the instructions are executable by a processor to perform steps of: receiving configuration information related to any of users, services, and correspondence between the users and the services; responsive to a request from a user, generating a SAML assertion for the request and attaching a stack of service tags with the SAML assertion, wherein the stack of service tags defines a service chain for the user and for the request; and providing the SAML assertion with the stack of service tags to the user in response to the request. The user provides the SAML assertion to one or more services, wherein each of the one or more services creates a context based on the stack of service tags, and wherein each of the one or more services identifies itself in the stack of service tags and sends the SAML assertion to a next service or application in the stack of service tags.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of a server which may be used in the cloud-based system of FIG. 1 or the like;

FIG. 3 is a block diagram of a mobile device which may be used in the cloud-based system of FIG. 1 or the like;

DETAILED DESCRIPTION OF THE DISCLOSURE

Again, in various exemplary embodiments, the present disclosure relates to systems and methods for cloud-based service chaining using Security Assertion Markup Language (SAML) Assertion. In particular, the systems and methods address the aforementioned service chaining issue for cloud-based as well as for enterprise internal hosted services without needing to pre-configure service providers. Again, existing service insertion and deployment techniques in enterprise networks fail to address new challenging requirements raised by modern network architectures such as distributed cloud, multi-tenancy, virtualization, elasticity, and orchestration. The current service deployment mechanisms usually involve heavy network or topological modifications which are fraught with risk and difficult to scale as networks grow. For instance, to add a firewall service function (SF) in an existing network requires modification at the network Layer 2 (L2) and necessitates the creation of a Virtual Local Area Network (VLAN) for an internal interface and an external interface thereby creating a new network segment. This tight coupling of network and service functions often precludes adaptive service scaling and requires hop-by-hop configuration of physical or virtual network devices. With the advent of SDNs and Network Functions Virtualization (NFV) techniques, service function chains (SFCs) can be automated, and virtual network connections can be setup between connected services to handle traffic flows. This gives flexibility to users to dynamically configure network services based on the origin, destination, and type of data flow. For instance, video and voice transmissions that need high performing networks can be routed through service functions that guarantee low latency and minimal jitter. Similarly, web traffic can be routed through a chain that includes virus scanning and phishing detection engine. Other embodiments are also contemplated.

The systems and methods leverage SAML assertions to discover and chain different cloud services by providing a uniform language to service providers for communication. Originally, SAML is an open standard data format for exchanging authentication and authorization data between parties, in particular, between an identity provider (IDP) and a service provider. The systems and methods extend the use of SAML assertions generated by an identity provider for consumption by multiple service providers in a service function chain. The use of SAML allows setting up of virtual connections between multiple heterogeneous service providers and creates a suite of connected services in a chain which can be dynamically altered to suit the prevailing conditions. Based on the attributes of a SAML assertion, a service provider S(i) can find its own position in the service chain and forward the processed data to the next service S(i+1) in the stack. For services which are agnostic to service layer implementation, a Service Function Chaining (SFC) proxy can also be implemented to handle the service layer functions.

SAML is defined in terms of assertions, protocols, bindings, and profiles. A SAML assertion is a package of information that supplies one or more statements made by a SAML authority. SAML defines three different kinds of assertion statement that can be created by a SAML authority: authentication, attribute, and authorization decision. For authentication, the specified subject was authenticated by a particular means at a particular time. This kind of statement is typically generated by a SAML authority called an identity provider, which is in charge of authenticating users and keeping track of other information about them. For an attribute, the specified subject is associated with the supplied attributes. For authorization decisions, a request to allow the specified subject to access the specified resource has been granted or denied. An assertion can include one or more statements. For single sign-on, a typical SAML assertion will contain a single authentication statement and possibly a single attribute statement. Note that a SAML response could contain multiple assertions, although it is more typical to have a single assertion within a response. The outer structure of an assertion is generic, providing information that is common to all of the statements within it. Within an assertion, a series of inner elements describe the authentication, attribute, authorization decision, or user-defined statements containing the specifics.

The systems and methods include a SAML-based service function chaining capability which automates discovery and provisioning of network services in a service chain that can be tuned to users, data type, and enterprise needs. Using SAML to chain different services allows topological independence of service functions thus benefitting individual service providers by making them immune to fluctuations in network topography. SAML provides flexibility in addition/deletion/modification of service functions as an identity provider can listen for health and load on different services and can reissue SAML assertions based on current environmental conditions. SAML allows a standardized communication protocol between different service functions that individually speak their own proprietary language. SAML-based service chains allow secure sharing of contextual metadata between communicating parties.

Exemplary Cloud System Architecture

Figure 1:
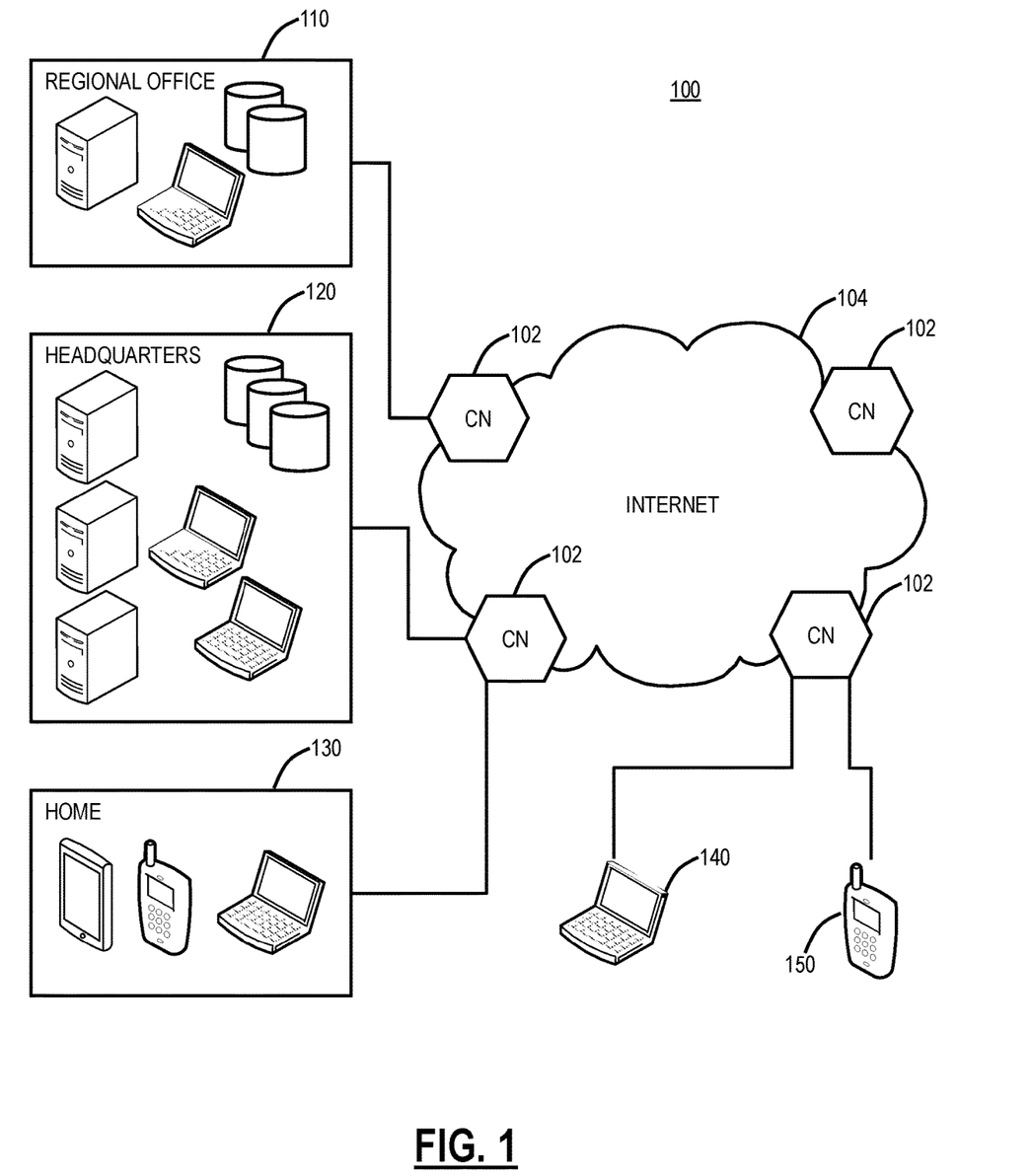
FIG. 1 is a network diagram of a cloud-based system for implementing various cloud-based service functions.
Figure 2:
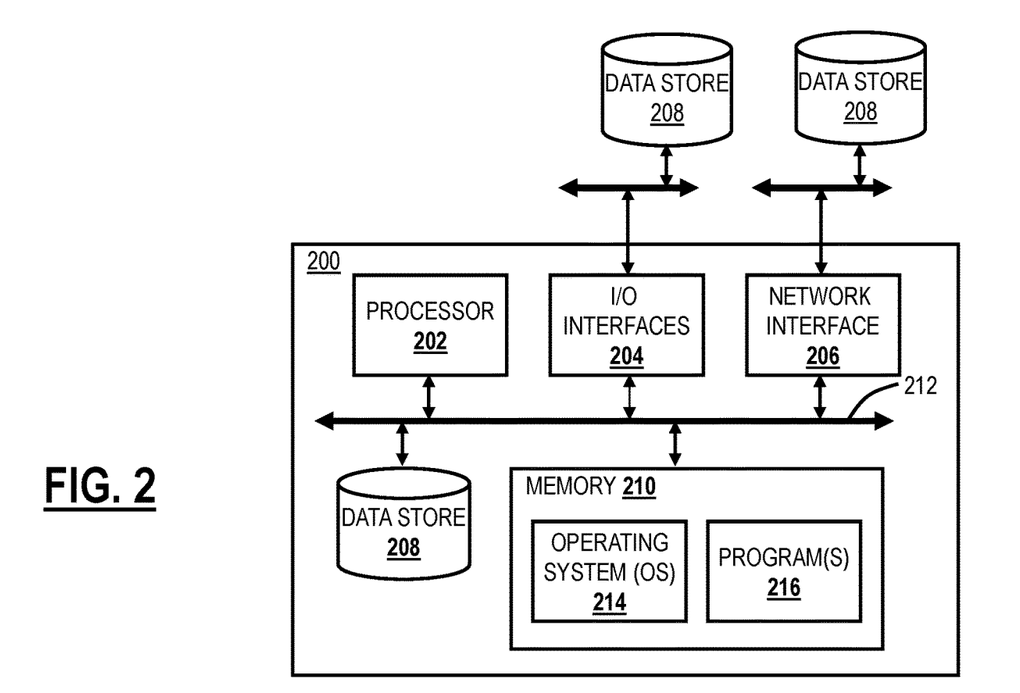

Referring to FIG. 1, in an exemplary embodiment, a network diagram illustrates a cloud-based system 100 for implementing various cloud-based service functions. The cloud-based system system 100 includes one or more cloud nodes (CN) 102 communicatively coupled to the Internet 104 or the like. The cloud nodes 102 may be implemented as a server 200 (as illustrated in FIG. 2), or the like, and can be geographically diverse from one another such as located at various data centers around the country or globe. For illustration purposes, the cloud-based system 100 can include a regional office 110, headquarters 120, various employee's homes 130, laptops/desktops 140, and mobile devices 150 each of which can be communicatively coupled to one of the cloud nodes 102. These locations 110, 120, 130 and devices 140, 150 are shown for illustrative purposes and those skilled in the art will recognize there are various access scenarios to the cloud-based system 100 all of which are contemplated herein.

Again, the cloud-based system 100 can provide any functionality through services such as software as a service, platform as a service, infrastructure as a service, security as a service, Virtual Network Functions (VNFs) in a Network Functions Virtualization (NFV) Infrastructure (NFVI), etc. to the locations 110, 120, 130 and devices 140, 150. The cloud-based system 100 is replacing the conventional deployment model where network devices are physically managed and cabled together in sequence to deliver the various services associated with the network devices. The cloud-based system 100 can be used to implement these services in the cloud without end users requiring the physical devices and management thereof. The cloud-based system 100 can provide services via VNFs (e.g., firewalls, Deep Packet Inspection (DPI), Network Address Translation (NAT), etc.). VNFs take the responsibility of handling specific network functions that run on one or more virtual machines (VMs), software containers, etc., on top of the hardware networking infrastructure—routers, switches, etc. Individual VNFs can be connected or combined together as building blocks in a service chain to offer a full-scale networking communication service. The cloud-based system 100 can provide other services in addition to VNFs, such as X-as-a-Service (XaaS) where X is security, access, etc.

Two exemplary services include Zscaler Internet Access (which can generally be referred to as Internet Access (IA)) and Zscaler Private Access (which can generally be referred to as Private Access (PA)), from Zscaler, Inc. (the assignee of the present application). The IA service can include firewall, threat prevention, Deep Packet Inspection (DPI), Data Leakage Prevention (DLP), and the like. The PA can include access control, micro service segmentation, etc. For example, the IA service can provide a user with Internet Access and the PA service can provide a user with access to enterprise resources in lieu of traditional Virtual Private Networks (VPNs).

Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one exemplary embodiment of a cloud-based system, and those of ordinary skill in the art will recognize the systems and methods described herein contemplate operation with any cloud-based system.

In an exemplary embodiment, the cloud-based system 100 can be a distributed security system or the like. Here, in the cloud-based system 100, traffic from various locations (and various devices located therein) such as the regional office 110, the headquarters 120, various employee's homes 130, laptops/desktops 140, and mobile devices 150 can be monitored or redirected to the cloud through the cloud nodes 102. That is, each of the locations 110, 120, 130, 140, 150 is communicatively coupled to the Internet 104 and can be monitored by the cloud nodes 102. The cloud-based system 100 may be configured to perform various functions such as spam filtering, uniform resource locator (URL) filtering, antivirus protection, bandwidth control, DLP, zero-day vulnerability protection, web 2.0 features, and the like. In an exemplary embodiment, the cloud-based system 100 may be viewed as Security-as-a-Service through the cloud, such as the IA.

Figure 3:
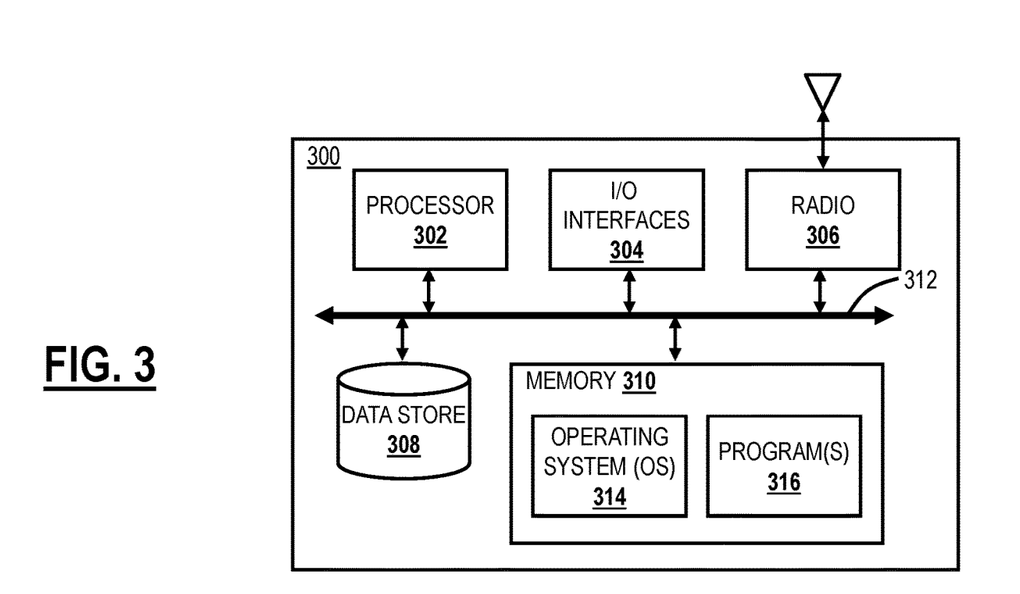

In an exemplary embodiment, the cloud-based system 100 can be configured to provide mobile device security and policy systems and methods. The mobile device 150 may be a mobile device 200 (as illustrated in FIG. 3) and may include common devices such as laptops, smartphones, tablets, netbooks, personal digital assistants, MP3 players, cell phones, e-book readers, and the like. The cloud-based system 100 is configured to provide security and policy enforcement for devices including the mobile devices 150 in the cloud. Advantageously, the cloud-based system 100, when operating as a distributed security system, avoids platform-specific security apps on the mobile devices 150, forwards web traffic through the cloud-based system 100, enables network administrators to define policies in the cloud, and enforces/cleans traffic in the cloud prior to delivery to the mobile devices 150. Further, through the cloud-based system 100, network administrators may define user-centric policies tied to users, not devices, with the policies being applied regardless of the device used by the user. The cloud-based system 100 provides 24×7 security with no need for updates as the cloud-based system 100 is always up-to-date with current threats and without requiring device signature updates. Also, the cloud-based system 100 enables multiple enforcement points, centralized provisioning, and logging, automatic traffic routing to the nearest cloud node 102, geographical distribution of the cloud nodes 102, policy shadowing of users which is dynamically available at the cloud nodes 102, etc.

Exemplary Server Architecture

Referring to FIG. 2, in an exemplary embodiment, a block diagram illustrates a server 200 which may be used in the cloud-based system 100, in other systems, or standalone. For example, the cloud nodes 102 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet 104. The network interface 206 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Exemplary Mobile Device Architecture

Referring to FIG. 3, in an exemplary embodiment, a block diagram illustrates a mobile device 300, which may be used in the cloud-based system 100 or the like. The mobile device 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 3 depicts the mobile device 310 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the mobile device 300 is in operation, the processor 302 is configured to execute software stored within the memory 310, to communicate data to and from the memory 310, and to generally control operations of the mobile device 300 pursuant to the software instructions. In an exemplary embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the mobile device 310. Additionally, the I/O interfaces 304 may further include an imaging device, i.e. camera, video camera, etc.

The radio 306 enables wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; proprietary wireless data communication protocols such as variants of Wireless USB; and any other protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system (O/S) 314 and programs 316. The operating system 314 essentially controls the execution of other computer programs, and provides scheduling, input-output control, file and data management, memory management, and communication control and related services. The programs 316 may include various applications, add-ons, etc. configured to provide end user functionality with the mobile device 300. For example, exemplary programs 316 may include, but not limited to, a web browser, social networking applications, streaming media applications, games, mapping and location applications, electronic mail applications, financial applications, and the like. In a typical example, the end user typically uses one or more of the programs 316 along with a network such as the cloud-based system 100.

Cloud-Based Services

Again, a Service Function Chain (SFC) defines an ordered set of service functions that must be applied to packets and/or frames selected as a result of classification. The services can be provided through the cloud-based system 100 or the like, and the services can include any of the aforementioned examples as well as any compute, networking, or storage related function which can be offered. Thus, an SFC creates an abstracted view of a service and specifies the set of required service functions as well as the order in which they must be executed. The SFC is described, for example, in IETF 7665 "Service Functioning Chaining (SFC) Architecture" (October 2015), the contents of which are incorporated by reference.

As described in IETF 7665, a network service (or simply service) is an offering provided by an operator that is delivered using one or more service functions. The term service can also be expanded to include an offering composed of several elements within the operator's network, whereas, for others, a service, or more specifically a network service, is a discrete element such as a firewall. A Service Function (SF) is a function that is responsible for the specific treatment of received packets. A Service Function can act at various layers of a protocol stack (e.g., at the network layer or other OSI layers). As a logical component, a service function can be realized as a virtual element or be embedded in a physical network element. One or more Service Functions can be embedded in the same network element. Multiple occurrences of the service function can exist in the same administrative domain. One or more service functions can be involved in the delivery of added-value services. A non-exhaustive list of abstract service functions includes: firewalls, WAN and application acceleration, Deep Packet Inspection (DPI), Lawful Intercept (LI), server load balancing, NAT44 [RFC3022], NAT64 [RFC6146], NPTv6 [RFC6296], HOST_ID injection, HTTP Header Enrichment functions, and TCP optimizer.

The classification includes locally instantiated matching of traffic flows against policy for subsequent application of the required set of network service functions. The policy may be customer/network/service specific. A Classifier is an element that performs classification. A Service Function Chain (SFC) defines an ordered set of abstract service functions and ordering constraints that must be applied to packets and/or frames and/or flows selected as a result of classification. The implied order may not be a linear progression as the architecture allows for SFCs that copy to more than one branch, and also allows for cases where there is flexibility in the order in which service functions need to be applied.

Again, conventionally, building a service chain to support a new application took a great deal of time and effort. It meant acquiring network devices and cabling them together in the required sequence. Each service required a specialized hardware device, and each device had to be individually configured in its own proprietary language. This was not only error prone but had the potential to disrupt entire network if one device went down. Traditionally, an IT admin used to create service chains by physically connection network hardware. With the advent of SDNs and NFVs and the cloud-based system 100, an IT admin can now automatically create a suite of connected services (like firewall, DPI, NAT) and connect them in a virtual chain. This does solve problems related to network devices which are on premise, sharing same authorization domain and under the direct control of the IT admin. However, with the evolution of new network technologies such as multi-tenancy, mobility and distributed programming, most of the services are moving to the cloud-based system 100, and there is a need for different cloud services to be chained for a particular network data flow. When these cloud services are not in a single domain, each service needs a user's authorization and authentication context without which a service function will not be able to evaluate and apply policies on the network data. This may further require the exchange of metadata or contextual information between nodes of different service functions.

SAML with Cloud-Based Services

Figure 4:
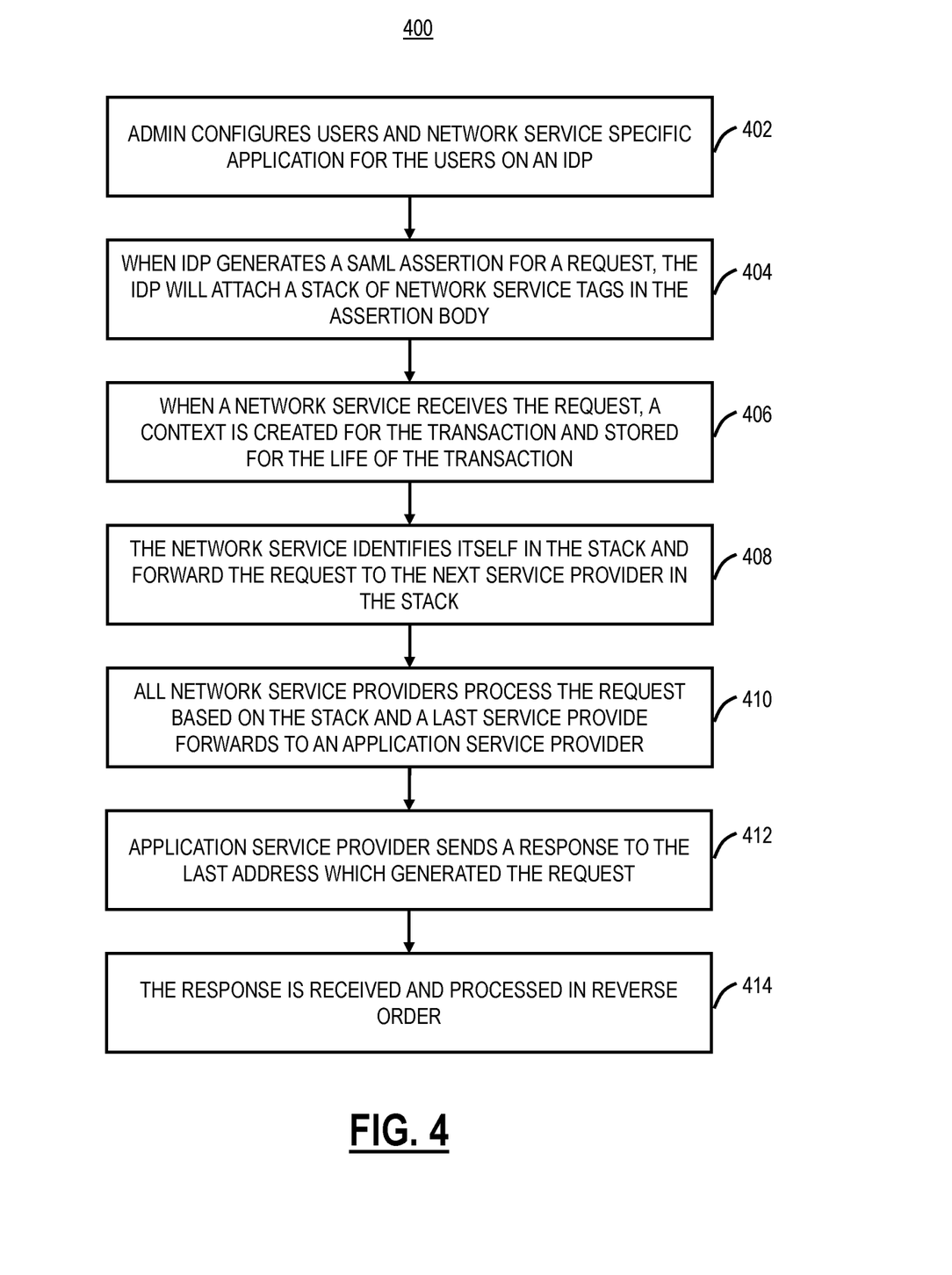
FIG. 4 is a flowchart of a SAML assertion based process for Service Function Chaining.

Referring to FIG. 4, in an exemplary embodiment, a flowchart illustrates a SAML assertion based process 400 for Service Function Chaining. Again, the systems and methods use SAML to construct a catalog of connected services as a service function chain. SAML provides an open standard data format for exchanging authentication and authorization data between parties, in particular, between an identity provider (IDP) and a service provider (SP). The SAML assertion based process 400 includes an administrator configuring users and network service specific applications for the user on an IDP (step 402). Here, the administrator can specify which network services the user will or could use. This step can be performed in advance for configuration of the user and the services. Again, the network services could be in the cloud-based system 100 as well as through different service providers.

When the IDP generates a SAML assertion for a request, the IDP will attach a stack of network service tags in the assertion body (step 404). The stack of network service tags for service providers $S_1, S_2, \ldots, S_n$ can include:

| | | | |
|---|---|---|---|
| $S_1$ | Network Service Provider 1 Information | Service Tags | Direction interest [request, response] |
| $S_2$ | Network Service Provider 2 Information | Service Tags | Direction interest [request, response] |
| ... | ... | ... | ... |
| $S_n$ | Network Service Provider n Information | Service Tags | Direction interest [request, response] |

When a network service receives, the request it may create the context for the transaction and store this network service tag stack for the life of that transaction (step 406). The network service identifies itself in the stack and forwards the request to the next service provider in the stack (step 408). That is, the network service looks for itself in the stack, and once processing is complete, it sends the request to the next service provider in the stack. The forwarding can use any transport model which can be controlled through a centralized control plane, such as OpenFlow or the like. All network service providers will process the request and eventually forward to an application service provider (step 410). The application service provider sends a response to the last address which generated the request, e.g., the network service provider S. The response will be received and processed in reverse order. If the service has provided no interested in a specific direction, it will be skipped.

Figure 5:
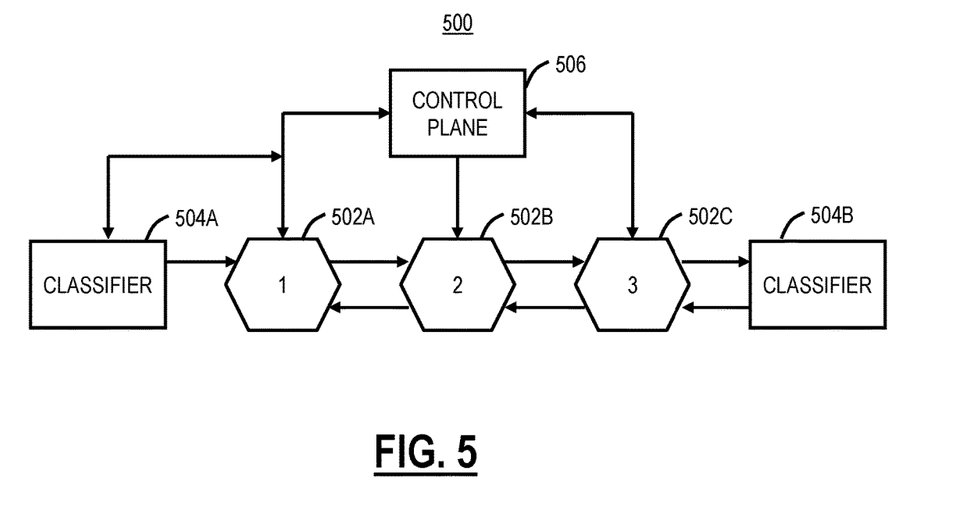
FIG. 5 is a diagram of an exemplary service function chaining architecture.

Referring to FIG. 5, in an exemplary embodiment, a diagram illustrates an exemplary service function chaining architecture 500. The service function chaining architecture 500 is generally described by the IETF. In this example, there are three services 502A, 502B, 502C in a service function chain. The service function chaining architecture 500 includes classifiers 504A, 504B which is a component that performs traffic classification and decides whether to send network traffic through the services 502 or not. The service function chaining architecture 500 also includes an SFC control plane 506 which is responsible for constructing the SFPs, translating the SFCs to the forwarding paths, and propagating path information to participating nodes—network and service—to achieve requisite forwarding behavior to construct the service overlay.

Figure 6:
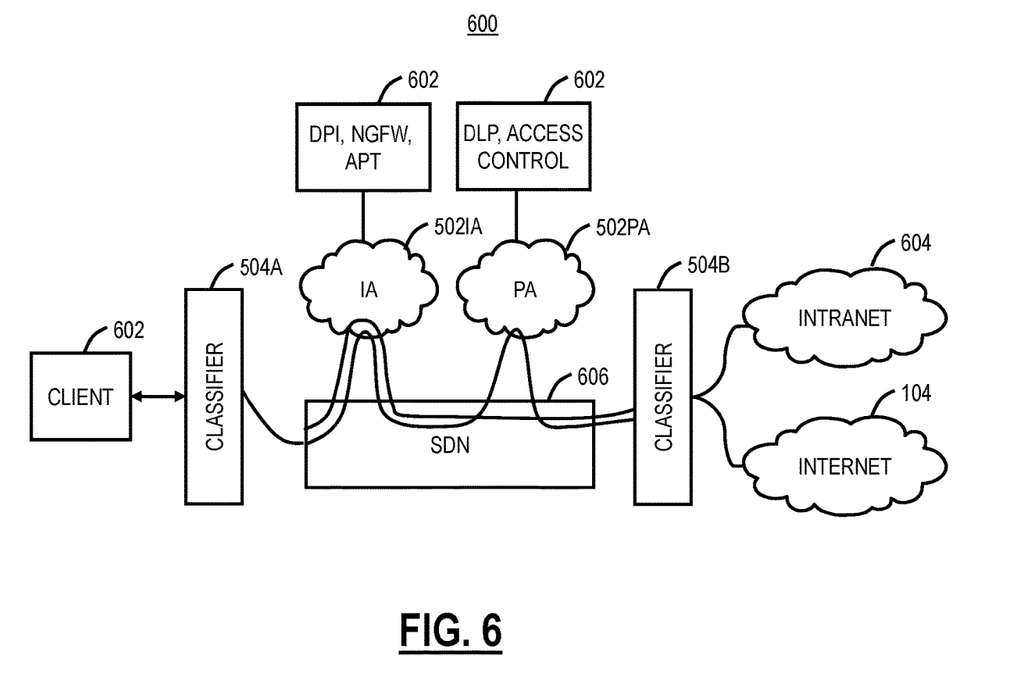
FIG. 6 is a network diagram of an exemplary implementation of a service chain.

Referring to FIG. 6, in an exemplary embodiment, a network diagram illustrates an exemplary implementation of a service chain 600. In this example, a client 602 is configured to access the Internet 104 and/or an Intranet 604 through a Software Defined Network (SDN) 606 or the like. The client 602 can include a mobile device, a laptop, a desktop, a tablet, or any other type of computing device. The Intranet 604 is a private network such as an enterprise network or the like. The SDN 606 provides network connectivity between the client 602 with the Internet 104 and/or the Intranet 604. The network connectivity can be at one or more layers such as optical, packet, and the like. Other network architectures besides SDN are also contemplated for the network connectivity.

In this exemplary embodiment, there are two services 502IA, 502PA, specifically an Internet Access (IA) service 502IA and a Private Access (PA) service 502PA. Again, the services 502IA, 502PA can be provided by Zscaler. In this exemplary service chain 600, the service 502IA provides firewall, threat prevention, DPI, etc. and is chained with the service 502PA which provides access control, micro service segmentation, etc. for resources in the Intranet 604. The service chain 600 allows the client 602 to connect to internal private resources in the Intranet 604 without VPNs, and with full malware analysis. For external resources, i.e., access by the client 602 to the Internet 104, only the service 502IA is used which may itself embody an abstraction of internally chained services (not shown). Hence individual cloud services may themselves chain multiple internal services depending upon their own design and resource constraints. For example, the service 502IA can implement a service chain of load balancers, malware scanning, deep packet inspection and firewall, and the service 502PA implements a service chain of DLP and Access control capabilities. With the service chain 600, the client 602 accesses multiple resources which are located either on the Internet 104 or on an enterprise's internal network, i.e., the Intranet 604.

For an exemplary implementation of the SAML assertion based process 400 with the service chain 600, the operations generally include service pre-configuration, IDP and service discovery and enrollment, and traffic forwarding and chaining. For service pre-configuration, an IT admin can configure all cloud services that are enabled for a particular user, based on the particular group or department that user belongs to, or the like. For instance, a user in the finance department may have an ordered set of services <S1, S2, S4> while a user in the marketing department may have only one service <S3>. This configuration is made available on a centralized server which the client can be made aware of a priori or can be allowed to discover dynamically using Dynamic Host Configuration Protocol (DHCP) or Web Proxy Auto-Discovery (WPAD).

For IDP and service discovery and enrollment, the client 602 learns the associated IDP for network services 502 from a centralized server. The client 602 authenticates the user against the IDP which is preconfigured with the ordered set of services that are enabled for the user. The client 602 uses a SAML Assertion Response from the IDP to discover all services 502 and uses for the authenticated session to enroll with. The client 602 also learns classifier 504 policies from each service provider that it will utilize in creating service paths for different types of network requests. Service providers can record the SAML Assertion for future reference.

Figure 7:
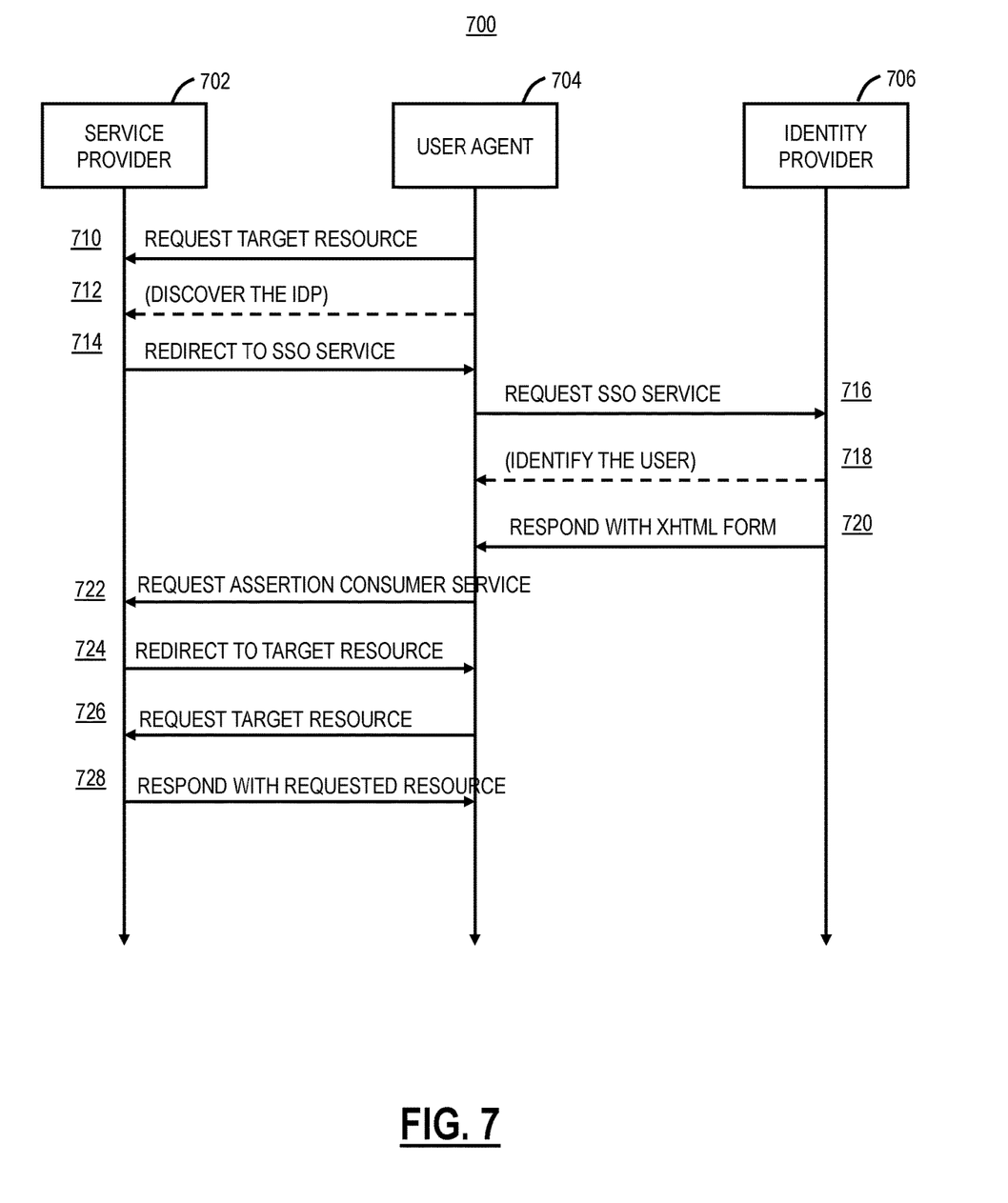
FIG. 7 is a flow diagram of exemplary interactions between a service provider, a user agent associated with the client, and an Identity Provider (IDP)

Referring to FIG. 7, in an exemplary embodiment, a flow diagram illustrates exemplary interactions between a service provider 702, a user agent 704 associated with the client 602, and an IDP 706. The user agent 704 can be an application, setting, browser, etc. executed on the client 602. The client 602, through the user agent 704, requests a target resource (step 710) and discovers the IDP (step 712) from the service provider 702, and the service provider 702 redirects the client 602 to a Single Sign On (SSO) service (step 714). The client 602 makes a request to the SSO service through the IDP 706 (step 716). The IDP 706 identifies the user (step 718) and responds with an XHTML (Extensible Hypertext Markup Language) form (step 720). The client 602, with the XHTML form, requests assertion consumer service from the service provider 702 (step 722) and the service provider 702 redirects the client 602 to a target resource (step 724). The client 602 requests the target resource (step 726), and the service 502 responds with the requested resource (step 728).

Referring back to FIG. 6, for traffic forwarding and chaining, the client 602 intercepts all outbound network traffic by opening up a virtual tunnel interface on the host machine. A classification engine encapsulates the incoming packets and appends a service layer header which contains an identifier to uniquely identify the SAML Assertion. A service function chain (SFC) proxy computes a service layer header when the service provider of the services is incognizant of any service chain. One receiving the packet and the header, the service function at the service 502 will consume the SAML identifier to find itself in the stack of services 502 from the SAML Assertion, consume any metadata from the previous service function, process the packet, add contextual data for the subsequent service function to consume and relay the packet to the next service function in the stack thereby creating a chain of connected services, i.e., the service chain 600. Note that service layer is agnostic of the transport mechanism and is not concerned with how the packets reach the service function which is the responsibility of the network service overlay or the SNF (Service Network Forwarder), e.g., the SDN 606. The services 502 which are not interested in processing the packet because of policy or incompatibility reasons can simply relay the packet to the consecutive service in the stack.

The service chain 600 can be unidirectional or bidirectional or a hybrid. A unidirectional SFC requires that traffic be forwarded through the ordered services 502 (SFs) in one direction (SF1→SF2→SF3), whereas a bidirectional service chain requires a symmetric path (SF1→SF2→SF3 and SF3→SF2→SF1). For a bidirectional service chain as in the case of the service chain 600, once all the service functions are complete, the direction of the packet from the application server is reversed and the packet flows from the server to client in the same service network path.

Service functions which are agnostic to the direction of flow and who do not want to process the packet again can simply relay the packets to the next service in the stack. For instance, an access control service function will not be interested in doing access control over outgoing packets whereas a malware analysis service chain will definitely have to process outgoing packets for detecting any malicious responses from a server. For service providers which are unaware of Service Layer functions and headers, a service chain proxy can be implemented on a centralized control plane 506 that can remove and insert SFC encapsulation on behalf of an SFC-unaware service function.

In the context of the service chain 600, the client 602 will reach to a mobile admin server in the service provider 702 and discover the IDP 706 and available services. The client 602 will authenticate with the IDP 706 and get a SAML Response containing a service chain and contextual information for services to consume, such as, for example:

```
<samlp:Response xmlns:samlp="urn:oasis:names:tc:SAML:2.0:protocol"
xmlns:saml="urn:oasis:names:tc:SAML:2.0:assertion"
ID="_8e8dc5f69a98cc4c1ff3427e5ce34606fd672P91e6" Version="2.0" IssueInstant="2014-07-
17T01:01:48Z" Destination="http://sp.example.com/demo1/index.php?acs"
InResponseTo="ONELOGIN_4fee3b046395c4e751011e97f8900b5273d56685">
    <saml:Issuer>http://idp.example.com/metadata.php</saml:Issuer>
    <samlp:Status>
        <samlp:StatusCode Value="urn:oasis:names:tc:SAML:2.0:status:Success"/>
    </samlp:Status>
....
        <saml:Conditions NotBefore="2014-07-17T01:01:18Z" NotOnOrAfter="2024-01-
18T06:21:48Z">
        <saml:AudienceRestriction>
            <saml:Audience>S1</saml:Audience>
            <saml:Audience>S2</saml:Audience>
            .....
            <saml:Audience>Sn</saml:Audience>
        </saml:AudienceRestriction>
        <saml:AttributeStatement>
....
        <saml:Attribute Name="ServiceChain"
NameFormat="urn:oasis:names:tc:SAML:2.0:attrname-format:basic">
            <saml:AttributeValue xsi:type="xs:string">
                (S1, Attributes1), (S2, Attributes2), ... ., (SN, AttributesN))
            </saml:AttributeValue>
        </saml:Attribute>
        </saml:AttributeStatement>
    </saml:Assertion>
....
</samlp:Response>
```

Figure 8:
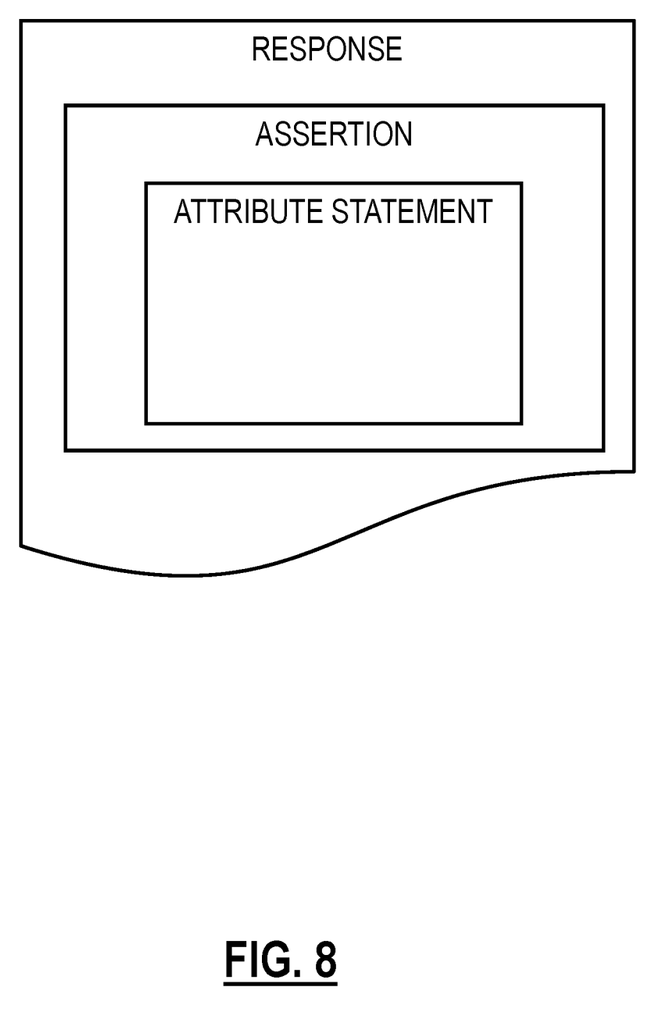
FIG. 8 is a logical diagram of a SAML Assertion and Response with the attribute statement included therein.

The client 602 will enroll the use with specific services as defined by the service chain 600 in the SAML Response. It is the function of the service provider 702 to store the SAML Assertion for future reference. FIG. 8 is a logical diagram of a SAML Assertion and Response with the attribute statement included therein. The client 602 will receive IP packets and will classify using the classifier 504A which packet to send to the service chain of the services 502IA, 502PA (ZIA and ZPA) depending upon the source, destination, user and type of network data. This decision making may be done locally by the client 602 or at a centralized controller plane 506 through policies obtained from a centralized server or the IDP 706.

The client 602 adds a service layer header to the original packet containing a SAML ID and forwards the packet to the first service (i.e., the service 502IA, ZIA) in the stack. At the ZIA service layer, the packet will be inspected for malware and once done; it will be relayed to the service 502PA, ZPA, (i.e., the next service in the SAML Assertion) which will perform access control and data loss prevention mechanism. Once all the service functions are complete, the response will be sent back to the client 602 which will decapsulate packets to remove all service layer headers and inject the response back into the TCP/IP stack of the host.

The SAML-based Service function chaining capability automates discovery and provisioning of network services in a service chain that can be tuned to users, data type, and enterprise needs. Using SAML to chain different services allows topological independence of service functions thus benefitting individual service providers by making them immune to fluctuations in network topography. SAML provides flexibility in addition/deletion/modification of service functions as an identity provider can listen for health and load on different services and can reissue SAML assertions based on current environmental conditions. SAML allows a standardized communication protocol between different service functions that individually speak their own proprietary language. SAML-based service chains allows secure sharing of contextual metadata between communicating parties It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A cloud-based method of service function chaining using Security Assertion Markup Language (SAML) assertions, the cloud-based method comprising:

obtaining configuration information related to any of users, services, and correspondence between the users and the services;

receiving a service request from a user;

responsive to receiving the service request from the user, generating a SAML assertion based on the service request;

attaching a stack of service tags with the SAML assertion, wherein the stack of service tags defines a service chain of a plurality of services and is based on the user and the service request; and providing the SAML assertion with the stack of service tags to the user in response to receiving the service request, wherein the stack of service tags comprises a plurality of entries each identifying a service provider associated with a service and a direction for requests and responses, for automating of discovery and provisioning of each of the plurality of services in the service chain.

2. The cloud-based method of claim 1, further comprising:

providing the SAML assertion by the user to the plurality of services, wherein each of the plurality of services creates a context based on the stack of service tags.

3. The cloud-based method of claim 2, wherein each of the plurality of services identifies itself in the stack of service tags and sends the SAML assertion to a next service of the plurality of services in the stack of service tags.

4. The cloud-based method of claim 1, wherein configuration information comprises an ordered set of the services for each user or for each group of users.

5. The cloud-based method of claim 1, wherein the obtaining, receiving, generating, attaching, and providing are performed by an Identity Provider.

6. The cloud-based method of claim 1, wherein at least two of the services are performed by different service providers such that the service chain extends between at least two service providers.

7. The cloud-based method of claim 1, wherein once the service chain is established, the user is configured to forward packets with a service layer header identifying a SAML ID for service providers associated with the stack of service tags.

8. The cloud-based method of claim 7, wherein the service providers are configured to identify the service chain based on the SAML ID and to process the packets based thereon.

9. The cloud-based method of claim 1, wherein a service function chain (SFC) proxy computes a service layer header when the service provider of the services is incognizant of any service chain.

10. A server configured to provide service function chaining using Security Assertion Markup Language (SAML) assertions, the server comprising:
- a network interface communicatively coupled to one or more cloud nodes;
- a processor communicatively coupled to the network interface; and
- memory storing computer-executable instructions that, when executed, cause the processor to:
  - obtain configuration information related to any of users, services, and correspondence between the users and the services;
  - receive a service request from a user;
  - responsive to receiving the service request from the user, generate a SAML assertion based on the service request;
  - attach a stack of service tags with the SAML assertion, wherein the stack of service tags defines a service chain of a plurality of services and is based on the user and the service request; and
  - provide the SAML assertion with the stack of service tags to the user in response to receiving the service request, wherein the stack of service tags comprises a plurality of entries each identifying a service provider associated with a service and a direction for requests and responses, for automating of discovery and provisioning of each of the plurality of services in the service chain.

11. The server of claim 10, wherein the user is configured to provide the SAML assertion to the plurality of services, wherein each of the plurality of services creates a context based on the stack of service tags.

12. The server of claim 11, wherein each of the plurality of services identifies itself in the stack of service tags and sends the SAML assertion to a next service of the plurality of services in the stack of service tags.

13. The server of claim 10, wherein configuration information comprises an ordered set of the services for each user or for each group of users.

14. The server of claim 10, wherein the server is operated by an Identity Provider.

15. The server of claim 10, wherein at least two of the services are performed by different service providers such that the service chain extends between at least two service providers.

16. The server of claim 10, wherein once the service chain is established, the user is configured to forward packets with a service layer header identifying a SAML ID for service providers associated with the stack of service tags.

17. The server of claim 16, wherein the service providers are configured to identify the service chain based on the SAML ID and to process the packets based thereon.

18. A non-transitory computer memory comprising instructions for service function chaining using Security Assertion Markup Language (SAML) assertions, the instructions are executable by a processor to perform steps of:
- obtaining configuration information related to any of users, services, and correspondence between the users and the services;
- receiving a service request from a user;
- responsive to receiving the service request from the user, generating a SAML assertion based on the service request;
- attaching a stack of service tags with the SAML assertion, wherein the stack of service tags defines a service chain of a plurality of services and is based on the user and the service request; and
- providing the SAML assertion with the stack of service tags to the user in response to receiving the service request, wherein the stack of service tags comprises a plurality of entries each identifying a service provider associated with a service and a direction for requests and responses, for automating of discovery and provisioning of each of the plurality of services in the service chain.

* * * * *